United States Patent [19]
Hoag et al.

[11] Patent Number: 6,092,360
[45] Date of Patent: Jul. 25, 2000

[54] AUXILIARY POWER UNIT PASSIVE COOLING SYSTEM

[75] Inventors: Michael S. Hoag; Steven K. Plank, both of Kent, Wash.

[73] Assignee: The Boeing Company, Seattle, Wash.

[21] Appl. No.: 09/108,900

[22] Filed: Jul. 1, 1998

[51] Int. Cl.[7] .................................. F02C 7/06; F02C 7/14
[52] U.S. Cl. ........................ 60/39.02; 60/39.08; 60/39.83; 244/58
[58] Field of Search ................................ 60/39.02, 39.08, 60/39.83; 184/6.11; 244/53 B, 53 R, 65, 57, 58

[56] References Cited

U.S. PATENT DOCUMENTS

5,987,877 11/1999 Steiner ..................................... 60/39.83

*Primary Examiner*—Charles G. Freay
*Attorney, Agent, or Firm*—Christensen O'Connor Johnson & Kindness PLLC

[57] ABSTRACT

A passive cooling system for an auxiliary power unit (10) located in an aft compartment (20) of an aircraft is provided in which cooling air is drawn into the compartment through an aft opening (54) located in the rear of the aircraft and discharged back to the atmosphere through an exhaust duct (42) connecting to a rear exhaust opening (44). The aft opening (54) is located above the exhaust opening (44). Cooling air is drawn into the compartment using an eductor (46) that is connected between a turbine (14) and the exhaust duct (42). The eductor (46) creates a low-pressure region that suctions compartment air, which in turn, suctions atmospheric air in through the aft opening (54). The combined compartment air and combustion gases are exhausted out the exhaust duct (42). In auxiliary power unit embodiments in which the compartment is located in a rear portion of the aircraft fuselage, the cooling system further includes an inlet duct (50) having a forward end (56) and an aft end (52). The aft end (52) is connected to the opening (54); the forward end (56) is connected to the compartment (20). The inlet duct (50) defines an airflow passage through which ambient air is drawn into the compartment (20) for use in cooling various auxiliary power unit components.

17 Claims, 4 Drawing Sheets

AUXILIARY POWER UNIT PASSIVE COOLING SYSTEM

FIELD OF THE INVENTION

The present invention relates to cooling systems for use with auxiliary power units on aircraft.

BACKGROUND OF THE INVENTION

Commercial aircraft often include an on-board auxiliary power unit to provide electrical power and compressed air to various systems. Auxiliary power units are mostly used when the aircraft is on the ground, but they may also be used to provide pneumatic and electrical power during flight. When the aircraft is on the ground, the auxiliary power unit is a main source of power to drive the environmental control systems, the air-driven hydraulic pumps, and the starters for the engines.

Auxiliary power units require a certain amount of cooling air. In particular, auxiliary power units are lubricated with oil that is cooled by an oil cooler. In some systems, an active fan (i.e., with moving mechanical parts) pushes air across the oil cooler and through the compartment within which the auxiliary power unit is housed. The active fan is driven at high speeds by a complex shaft and gear assembly operatively connected to the auxiliary power unit. Because of the high operating speeds and numerous complex mechanical components, active fans may fail after extended periods of use. Fan failures have a negative impact on the reliability of auxiliary power units, which ultimately increases the cost of operating the aircraft. Accordingly, it has been the goal of auxiliary power unit designers to configure a passive cooling system that reduces or eliminates the number of complex moving mechanical parts.

One known passive system is described in U.S. Pat. No. 5,655,359. In the '359 device, a vacuum system passively cools both the oil cooler and the entire auxiliary power unit compartment. The system consists of two concentric nozzles positioned downstream of the auxiliary power unit turbine. An inner nozzle (or primary nozzle) flows high speed primary exhaust gas out of the gas turbine. An outer nozzle is positioned about the inner nozzle and is connected to a large circular plenum structure. The outer nozzle and plenum structure are referenced to the static air pressure of the auxiliary power unit compartment through one or more openings spaced around the plenum structure.

The combination of concentric nozzles, radial openings, and plenum structure functions as an aspirator, or pumping device, commonly called an eductor system when applied to auxiliary power unit installations. The outer nozzle provides a passage for expulsion of compartment air out the tail cone of the aircraft. The relative velocity difference between the gas fluid in the inner and outer nozzles creates a depressed pressure region in the eductor. This provides a "pumping" action to draw compartment air into the eductor and into the outer nozzle to combine with the primary turbine exhaust gas. By placing the oil cooler adjacent the eductor, compartment air will flow through the oil cooler passages, thus cooling its internal oil.

The '359 arrangement further includes an air intake duct extending between a forward-facing ambient air opening and the auxiliary power unit. The opening is typically closed when the auxiliary power unit is off and open when on. In the open position, a door protrudes above the aircraft skin. During flight, the auxiliary power unit is ram-fed combustion air by the ambient airflow coming into the opening and through the intake duct. An inlet scoop is positioned inside the intake duct to separate and route a portion of the ram-fed airflow into the auxiliary power unit compartment. For ground and flight operation, the pumping action of the eductor system draws the scoop air into the compartment, through the oil cooler and out the outer exhaust nozzle. This dedicated airflow is utilized for cooling various auxiliary power unit components, such as the oil cooler, as well as maintaining an acceptable auxiliary power unit compartment air temperature.

While the '359 system is effective in reducing the overall number of moving parts, it has the disadvantage of requiring a relatively large opening in order to provide sufficient air to the auxiliary power unit for combustion and air to the auxiliary power unit compartment for cooling. The large opening requires a large, operable door, which can undesirably cause aerodynamic drag and other performance penalties during flight. In addition, the overall large size of the intake duct makes it undesirably heavy.

Thus, a need exists for a passive auxiliary power unit oil cooling system that is lighter weight and more aerodynamically efficient. The present invention is directed to fulfilling this need.

SUMMARY OF THE INVENTION

In accordance with aspects of the present invention, provided is an aircraft having an exterior rear surface and a rear exhaust opening, characterized by the combination of an aft aircraft compartment, an auxiliary power unit located in the aft aircraft compartment, and a second opening. The auxiliary power unit includes a turbine, an exhaust duct extending to a rear exhaust opening in the aircraft exterior rear surface, and an eductor. The second opening is in the exterior rear surface of the aircraft at a location above the rear exhaust opening. The second opening connects to the auxiliary power unit compartment. During use of the auxiliary power unit, the eductor draws air in from the second opening to cool portions of the auxiliary power unit and expels the air out the exhaust opening. In preferred embodiments, the second opening is located directly above the rear exhaust opening. Additionally, it is preferable that the second opening be unencumbered by any physical means that restrict or prohibit airflow.

For embodiments in which the aft aircraft compartment is located a distance from the rear surface, the present invention is further characterized by an inlet duct having a forward end and an aft end. The inlet duct forward end is connected to the aft aircraft compartment, and the inlet duct aft end is connected to the second opening. During use of the auxiliary power unit, the eductor draws air from the second opening via the inlet duct. One embodiment of the inlet is capable of passing cooling in an amount in the range of about 60 to about 100 pounds per minute.

In accordance with other aspects of this invention, provided is an improvement to an aircraft auxiliary power unit located in a compartment in an aft aircraft region and having an oil cooler. The unit includes an eductor for expelling compartment air out an exhaust opening located in the rear of the aircraft, and an oil cooler positioned near the eductor. The improvement includes an inlet opening located in the rear of the aircraft at a position above the exhaust opening. An inlet duct extends between the inlet opening and the auxiliary power unit compartment. The inlet duct defines an airflow passage through which ambient air is drawn into the compartment by the eductor and expelled out the exhaust opening. The passing of air through the compartment cools oil flowing through the oil cooler.

In accordance with further aspects of this invention, the inlet duct includes a heat resistant material formed of multi-ply solid laminate fiberglass composite, titanium, steel, aluminum, high temperature silicone sealants, or Teflon impregnated dynamic sealant. In one embodiment, the inlet includes a non-symmetrically shaped forward end connected to the compartment and a circularly-shaped aft end connected to the inlet opening. In another embodiment, the inlet includes an inlet fairing located at the inlet opening. The inlet aft end is connected to the inlet fairing via a dynamically sealed slip-joint. In another embodiment, the inlet includes a statically sealed attachment flange. The inlet forward end is connected to the attachment flange which is further connected to compartment.

In accordance with still other aspects of this invention, a method for passively cooling auxiliary power unit components located in an auxiliary power unit compartment positioned in the aft region of an aircraft is provided. The method includes inducing an airflow from an aft opening located in the rear of the aircraft using an eductor and discharging the air to the atmosphere. The inducing of airflow occurs at a rear aircraft location above the discharging of air to the atmosphere. In one embodiment, the inducing of an airflow is accomplished at a rate in the range of about 60 to about 100 pounds per minute. Depending on the particular aircraft, the inducing of an airflow may include drawing air through an inlet duct that extends between the aft opening and the compartment. The inlet duct includes a forward end, an aft end, and an inlet fairing at the inlet opening. The inlet aft end is preferably connected to the inlet fairing via a dynamically sealed slip-joint. In one embodiment, the inlet duct forward end is connected to an attachment flange which is further connected to compartment.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The present invention is a passive cooling system for auxiliary power units whereby cooling air is provided to the auxiliary power unit compartment from an opening located in the aft end of the aircraft, above the exhaust opening. The cooling air is available for use in cooling the auxiliary power unit external components and, particularly, the oil cooler. The present invention may be practiced on various types of auxiliary power units and at various unit locations. The embodiments of FIGS. 1–6 are thus meant to be illustrative and not limiting.

Figure 1:
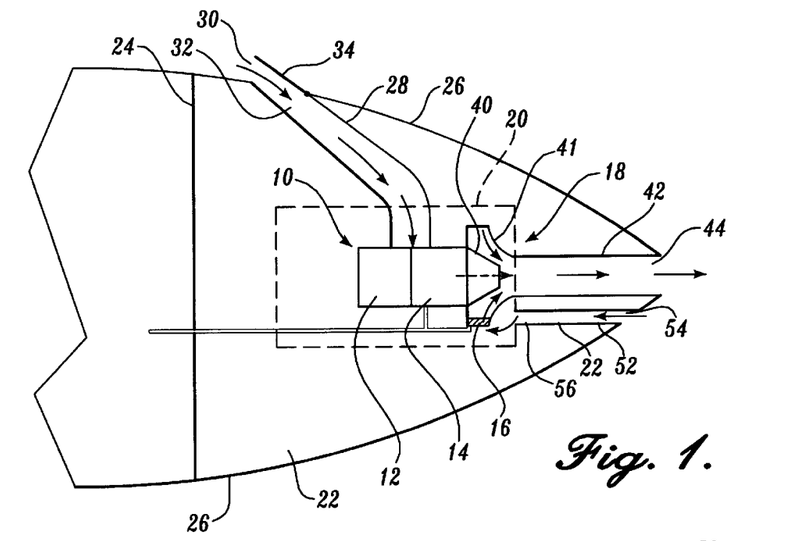
FIG. 1 is a topdown schematic illustration of one embodiment of a passive cooling system formed in accordance with the present invention.

FIG. 1 schematically illustrates one embodiment of a passive cooling system formed in accordance with the present invention for use with an auxiliary power unit 10. The auxiliary power unit includes a number of compressors 12, a turbine 14, an oil cooler 16, and an exhaust assembly 18. The auxiliary power unit is positioned in a compartment 20 located in the aft fuselage 22 of the aircraft. The compartment is sealed from the rest of the fuselage by various firewalls 24 and surfaces 26 of the craft.

An intake duct 28 extends between an intake opening 30 in the aircraft exterior surface and the auxiliary power unit 10. The intake duct 28 defines an airflow passage 32 through which the auxiliary power unit obtains its combustion air. A door 34 is pivotally attached to the aircraft exterior surface 26 at the trailing edge of the intake opening 30. When the door 34 is open, as shown in FIG. 1, air will flow in the direction of the arrows under the influence of the auxiliary power unit itself during ground operations, and under the influence of both the airstream ram force and the auxiliary power unit during flight operations.

Still referring to FIG. 1, the exhaust assembly 18 includes a primary nozzle 40 and an exhaust duct 42. The primary nozzle 40 is attached to the turbine 14, and the exhaust duct 42 is positioned near the nozzle 40. Combustion gases from the turbine are expelled out the primary nozzle 40 into the exhaust duct 42 and out an aft exhaust opening 44 of the tail cone.

The cooling system includes an eductor 46 located at the transition between the primary nozzle 40 and the exhaust duct 42. The eductor forms a vacuum passage between the primary nozzle 40 and the exhaust duct 42, and may be configured using any of a number of known structures. In the embodiment of FIG. 1, the eductor is a large circular plenum structure that forms a vacuum passage between the primary nozzle 40 and a secondary nozzle 41 that extends from the forward end of the exhaust duct 42. The secondary nozzle 41 in this embodiment is formed as an integral part of the eductor plenum structure. The eductor 46 is connected to the aftmost outer structure of the turbine (just prior to the primary nozzle).

The eductor 46 includes an opening located in the circumference of the eductor plenum. The opening and the secondary nozzle 41 are referenced to the static pressure of the auxiliary power unit compartment. The oil cooler 16 is located adjacent the outward opening of the eductor so that cooling air will be drawn across the oil cooler before entering the eductor 46. In preferred embodiments, an oil cooler first side is an exterior side surface facing the compartment and an oil cooler second side is an interior side surface facing the eductor.

During auxiliary power unit use, combustion gases are exited from the turbine through the primary nozzle 40. The combustion gases pass from the nozzle 40 to combine with compartment air that is drawn in from the compartment throught the oil cooler 16 and concentrically pumped between the primary nozzle 40 and the secondary nozzle 41. The combined gases pass through the exhaust duct 42 where they are expelled out the tail cone exhaust opening 44. The primary nozzle 40 and the secondary nozzle 41 thus control the mixing contact between the combustion gases and the compartment air from the eductor. By reducing the primary nozzle diameter, the velocity of the turbine exhaust increases. As the higher velocity combustion gases exit the primary nozzle, a low-pressure region or partial vacuum is created in the eductor. The drawn air is entrained into and expelled with the combustion gases.

Figure 2:
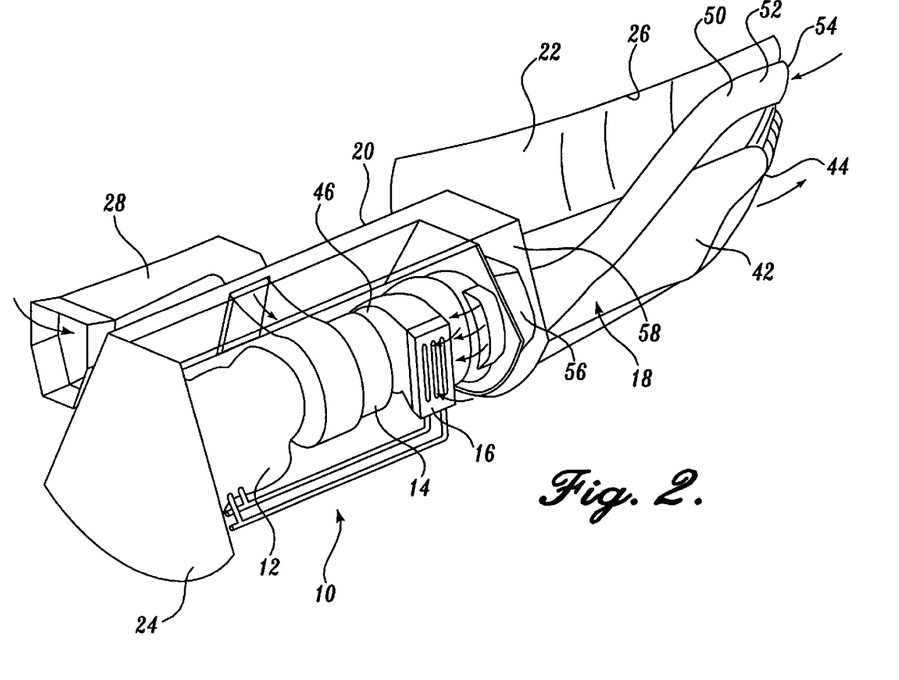
FIG. 2 is a perspective view of another embodiment of a passive cooling system formed in accordance with the present invention.

Referring to FIG. 2, ambient air is supplied to the auxiliary power unit compartment through a second opening 54 in the rear of the aircraft. Because the auxiliary power unit compartment shown in FIG. 2 is located in the rear of the fuselage, the passive cooling system includes an inlet duct 50 for shuttling cooling air into the compartment from the second opening 54. For those embodiments in which the auxiliary power unit compartment is located in the aircraft tailcone, the inlet duct may be unnecessary.

Still referring to FIG. 2, the inlet duct 50 includes an aft end 52 connected to the second aft opening 54. This second opening 54 (also referred to herein as the inlet opening) is preferably positioned directly above the exhaust opening 44. The inlet duct 50 further includes a forward end 56 connected to the auxiliary power unit compartment 20. During auxiliary power unit use, atmospheric air is drawn into the inlet duct opening 54, passed through the inlet duct 50, and into the auxiliary power unit compartment 20. The drawn air is used to continuously cool various auxiliary power unit components, including, in particular, the oil cooler.

This action is caused by the suction force of the eductor 46 and facilitated in-flight by the relatively high local static pressure at the aftmost regions of the aircraft. The suctioned air is combined with combustion air and discharged back to the atmosphere at the exhaust opening 44. A further benefit may be realized by positioning the inlet aft opening 54 directly above the exhaust opening 44. In doing so, the static pressure difference between the two openings is minimized, thus reducing the amount of pumping work required by the auxiliary power unit eductor.

Figures 3, 4:
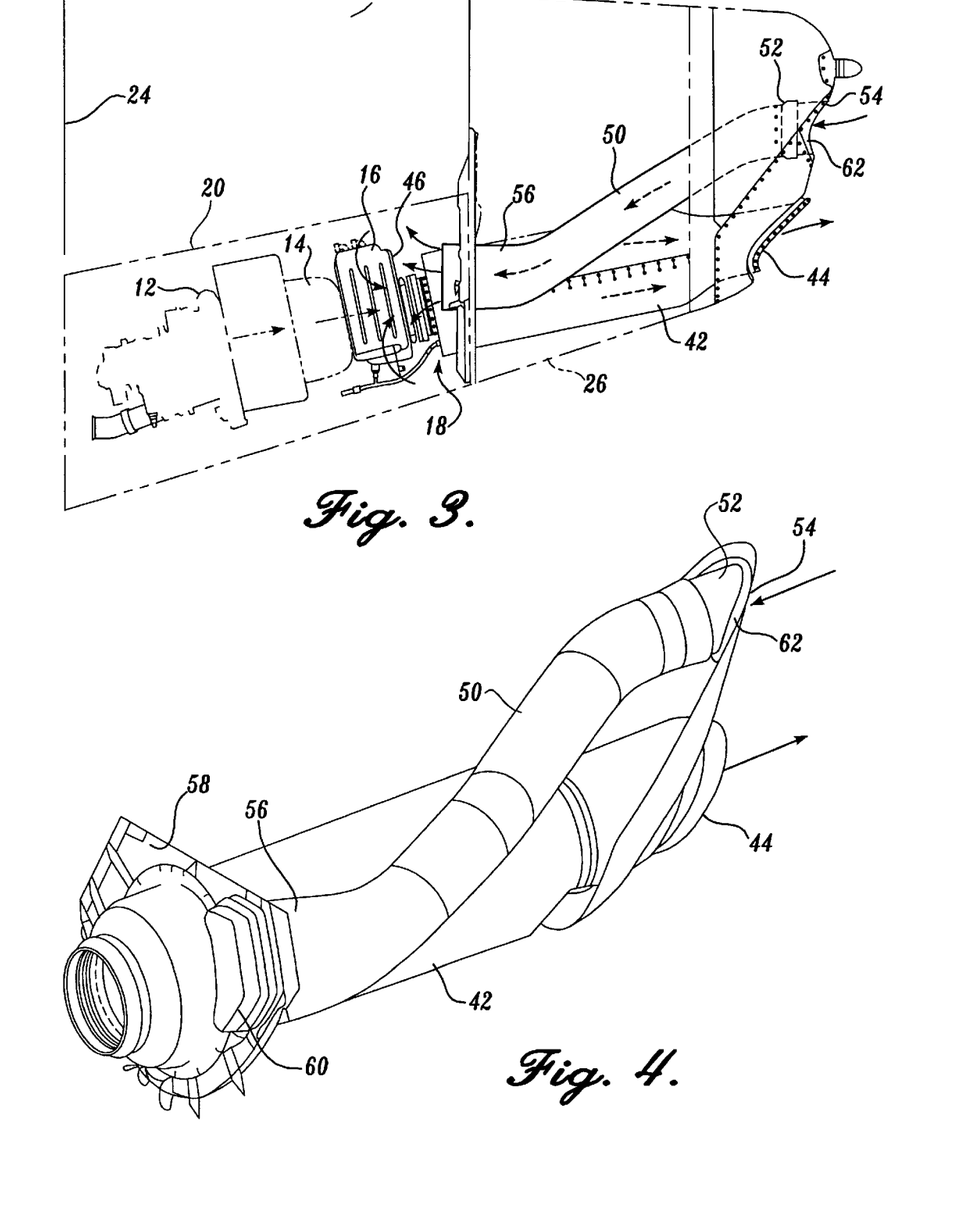
FIG. 3 is a side elevation view of the system of FIG. 2.
FIG. 4 is a perspective view of the air intake duct of FIG. 3.
Figure 5:
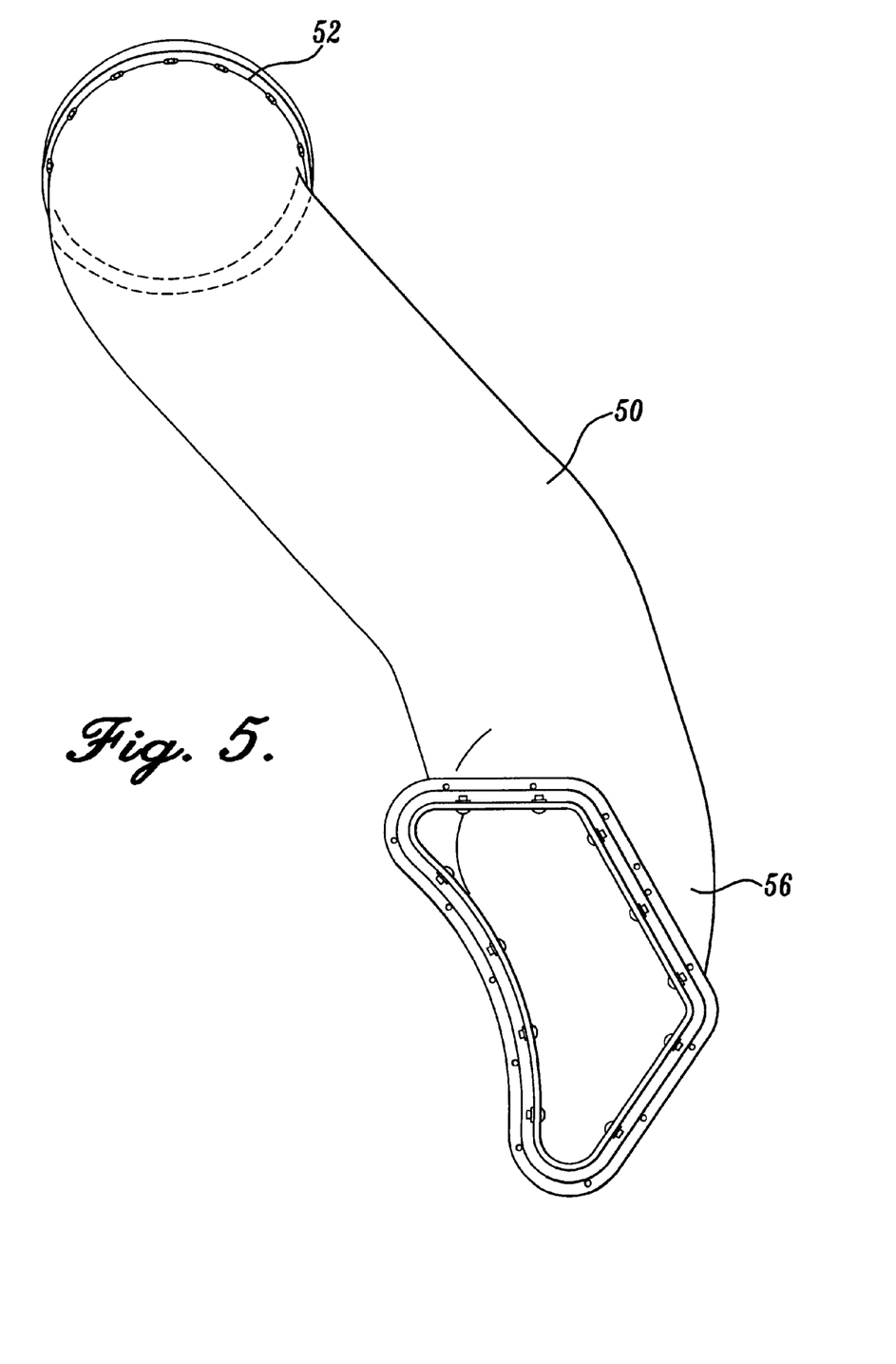
FIG. 5 is a front elevation view of the duct of FIG. 4.
Figure 6:
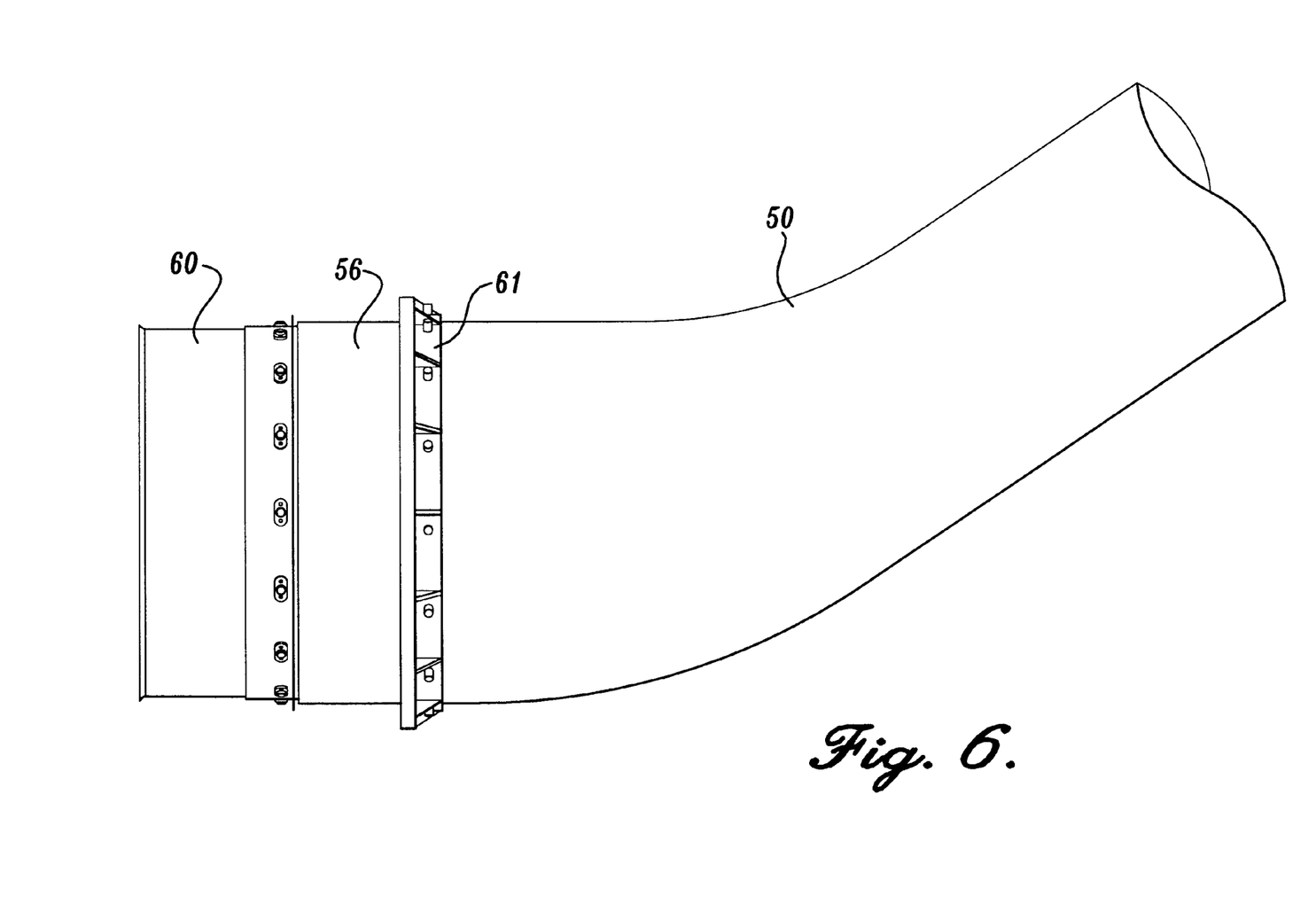
FIG. 6 is a side elevation view of the duct of FIG. 4.

The particular inlet duct embodiment shown in FIGS. 4–6 is for use with a Boeing 737 aircraft. The inlet duct is preferably formed from fireproof and heat resistant materials, e.g., multi-ply solid laminate fiberglass composite, titanium, corrosion-resistant steel sheet metal, aluminum casting, high temperature silicone sealants, Teflon impregnated dynamic seal, etc. The inlet duct aft end is circularly shaped in cross-section and the forward end is non-symmetrically shaped to conform to the mounting area of the 737 auxiliary power unit compartment aft bulkhead 58. For this configuration, the inlet passage extends lineally approximately 60 inches. Referring to FIG. 6, the inlet duct includes a fireproof forward sleeve 60 statically sealed to an attachment flange 61 which is connect to the auxiliary power unit compartment. An aft inlet duct fairing 62 is provided at the aft inlet opening 54 to encourage a smooth passage of air entering the inlet. The inlet aft end is connected to the inlet fairing via a dynamically sealed slip-joint. It is preferable to keep the inlet opening open and unencumbered by physical methods of closure (such as a valve or similar device).

Because the volume of cooling air through the compartment must be sufficient to cool the auxiliary power unit external components and the internal engine oil flowing through the oil cooler, the size of the eductor inlet duct 50 must be sufficient to feed the eductor 46. Likewise, the characteristics of the primary nozzle 40 and the secondary nozzle 41 must provide the requisite pressure difference to form an acceptable suction force. The amount of inlet duct air throughput will vary according to the particular type of aircraft and auxiliary power unit. In the case of the Boeing 737 aircraft of FIGS. 5 and 6, an Allied-Signal 131-9[B] auxiliary power unit with concentric conical-shaped nozzles is used. The inlet duct and inlet opening is capable of passing cooling air in the range of approximately 60–120 pounds per minute, depending on the auxiliary power unit operating mode.

As will be appreciated from a reading of the above, the present invention passive cooling system relieves the intake duct from having to provide cooling air to the auxiliary power unit compartment for use in cooling the auxiliary power unit external components and the oil cooler. By having a separate air inlet to provide cooling air to the compartment, a smaller amount of ram air is required at the intake duct. This, in turn, permits a smaller forward-facing intake opening and door, and correspondingly less aerodynamic drag (both in terms of pumping drag and form drag). The smaller sizes of the intake duct and door further helps to reduce system weight.

The present invention passive cooling system also reduces the amount of work required by the auxiliary power unit to draw cooling air into the compartment. This is further complemented by locating the inlet opening at the aft exterior surface of the fuselage tail cone and directly above the exhaust opening. One benefit of this location is that the local static pressure difference in-flight between the inlet opening and the exhaust opening is small, so that the amount of work necessary to pump air through the eductor system and expel it out the exhaust duct is minimized. Another benefit of this location is that there is no discernible aerodynamic drag (either form drag or pumping drag) contributed by the eductor inlet duct.

While the preferred embodiment of the invention has been illustrated and described, it will be appreciated that various changes can be made therein without departing from the spirit and scope of the invention. In particular, for those installation of auxiliary power units that are positioned in the aircraft tailcone, the inlet duct may be unnecessary. In such cases, the present invention passive cooling system is provided without an inlet duct.

What is claimed is:

1. An aircraft having an exterior rear surface and a rear exhaust opening, characterized by the combination of
   an aft aircraft compartment;
   an auxiliary power unit located in the aft aircraft compartment, the auxiliary power unit including a turbine, an exhaust duct extending to a rear exhaust opening in the aircraft exterior rear surface, and an eductor;
   a second opening in the exterior rear surface of the aircraft at a location above the rear exhaust opening, the second opening connecting to the auxiliary power unit compartment; during use of the auxiliary power unit, the eductor draws air in from the second opening to cool portions of the auxiliary power unit and expels the air out the exhaust opening; and
   an inlet duct having a forward end and an aft end, the inlet duct forward end being connected to the aft aircraft compartment, the inlet aft end being connected to the second opening; during use of the auxiliary power unit, the eductor draws air from the second opening via the inlet duct.

2. The passive cooling system according to claim 1, in which the second opening is located directly above the rear exhaust opening.

3. The passive cooling system according to claim 1, in which the second opening is unencumbered by physical means that restrict or prohibit airflow.

4. The passing cooling system according to claim 1, wherein the inlet is capable of passing cooling in an amount in the range of about 60 to about 100 pounds per minute.

5. In an aircraft auxiliary power unit located in a compartment in an aft aircraft region and having an oil cooler, the unit including an eductor for expelling compartment air out an exhaust opening located in the rear of the aircraft, the unit further including an oil cooler positioned near the eductor, the improvement comprising:

an inlet opening located in the rear of the aircraft at a position above the exhaust opening; and an inlet duct extending between the inlet opening and the auxiliary power unit compartment; the inlet duct defining an airflow passage through which ambient air is drawn into the compartment by the eductor and expelled out the exhaust opening; wherein the passing of air through the compartment cools oil flowing through the oil cooler.

6. The improvement according to claim 5, wherein the inlet opening is located directly above the rear exhaust opening.

7. The improvement according to claim 5, wherein the inlet duct includes a heat resistant material from the group comprising multi-ply solid laminate fiberglass composite, titanium, steel, aluminum, high temperature silicone sealants, and Teflon impregnated dynamic sealant.

8. The improvement according to claim 5, wherein the inlet includes a non-symmetrically shaped forward end connected to the compartment and a circularly-shaped aft end connected to the inlet opening.

9. The improvement according to claim 5, wherein the inlet is capable of passing cooling in an amount in the range of about 60 to about 100 pounds per minute.

10. The improvement according to claim 5, wherein the inlet includes a forward end and an aft end, the improvement further comprising an inlet fairing at the inlet opening, the inlet aft end being connected to the inlet fairing via a dynamically sealed slip-joint.

11. The improvement according to claim 5, wherein the inlet includes a forward end and an aft end, the improvement further comprising a statically sealed attachment flange, the inlet forward end being connected to the attachment flange which is further connected to compartment.

12. The improvement according to claim 5, wherein the inlet opening is unencumbered by physical means to restrict or prohibit airflow.

13. A method for passively cooling auxiliary power unit components located in an auxiliary power unit compartment positioned in the aft region of an aircraft, the method comprising;

(a) inducing an airflow from an aft opening located in the rear of the aircraft using an eductor, wherein the inducing of the airflow includes drawing air through an inlet duct extending between the aft opening and the compartment;

(b) discharging the air to the atmosphere; wherein the inducing of airflow occurs at a rear aircraft location above the discharging of air to the atmosphere.

14. The method according to claim 13, wherein the inducing of an airflow includes inducing an amount of airflow in the range of about 60 to about 100 pounds per minute.

15. The method according to claim 13, wherein the aft opening is unencumbered by physical means to restrict or prohibit airflow.

16. The method according to claim 13, wherein the inlet duct includes a forward end, an aft end, and an inlet fairing at the inlet opening, the inlet aft end being connected to the inlet fairing via a dynamically sealed slip-joint.

17. The method according to claim 13, wherein the inlet duct includes a forward end, an aft end, and a statically sealed attachment flange, the inlet forward end being connected to the attachment flange which is further connected to compartment.

* * * * *

UNITED STATES PATENT AND TRADEMARK OFFICE
CERTIFICATE OF CORRECTION

PATENT NO. : 6,092,360
DATED : July 25, 2000
INVENTOR(S) : M.S. Hoag et al.

It is certified that error appears in the above-identified patent and that said Letters Patent is hereby corrected as shown below:

ON THE TITLE PAGE
Item

| | | |
|---|---|---|
| [56]<br>Pg. 1, col. 1 | Refs. Cited<br>(U.S. Patents) | insert the following reference in appropriate numerical order: |

--5,655,359   8/1997   Campbell et al.--

| | | |
|---|---|---|
| [56]<br>Pg. 1, col. 1 | Refs. Cited<br>(U.S. Patents) | insert the following references in appropriate numerical order: |

--2,706,255   1/1954   Breaux et al.
4,351,150   9/1982   Schulze
4,418,879   12/1983   Vanderleest
4,934,154   6/1990   Altoz et al.
4,999,994   3/1991   Rüd et al.
5,265,408   11/1993   Sheoran et al.
5,284,012   2/1994   Laborie et al.--

| Column | Line | |
|---|---|---|
| 6<br>(Claim 4, | 62<br>line 2) | "passing cooling" should read --passing cooling air-- |
| 7<br>(Claim 9, | 25<br>line 2) | "passing cooling" should read --passing cooling air-- |
| 8<br>(Claim 11, | 2<br>line 5) | before "compartment" insert --the-- |

UNITED STATES PATENT AND TRADEMARK OFFICE
CERTIFICATE OF CORRECTION

PATENT NO. : 6,092,360
DATED : July 25, 2000
INVENTOR(S) : M.S. Hoag et al.

It is certified that error appears in the above-identified patent and that said Letters Patent is hereby corrected as shown below:

COLUMN　　LINE

8　　　　　　31　　　before "compartment" insert --the--
(Claim 17,　line 4)

Signed and Sealed this

Twenty-ninth Day of May, 2001

Attest:

NICHOLAS P. GODICI

Attesting Officer　　　Acting Director of the United States Patent and Trademark Office